May 24, 1927. 1,629,781
J. W. DODD
ELECTRICALLY RELEASED BRAKE
Filed June 3, 1925  2 Sheets-Sheet 1
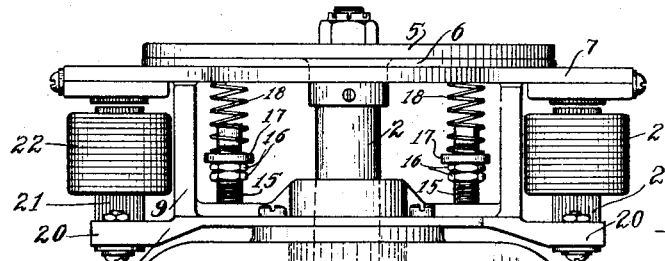
Fig. 1
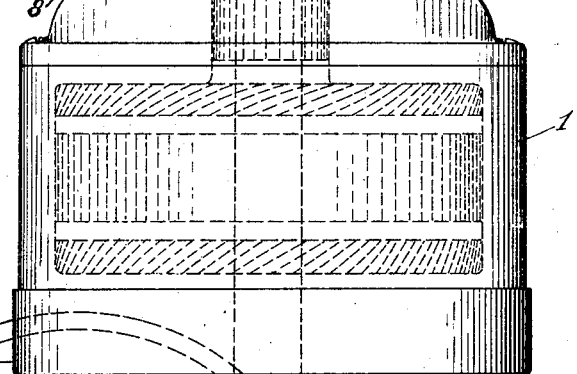
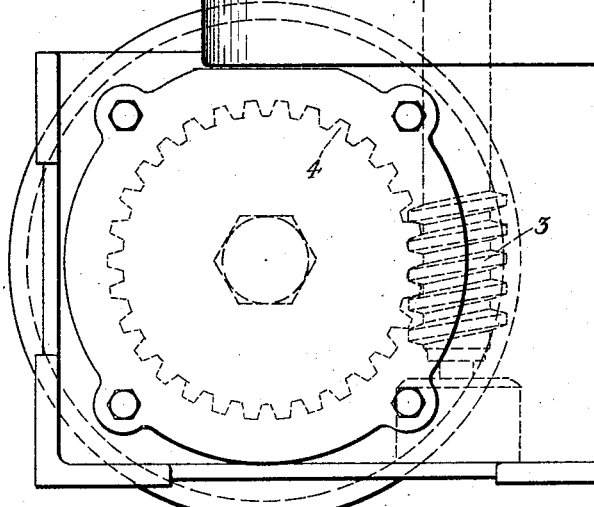
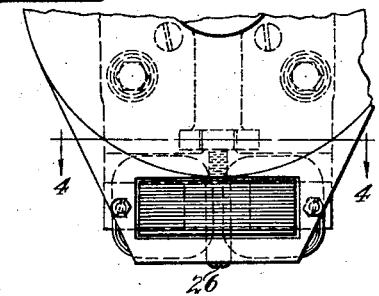
Fig. 3
Fig. 4
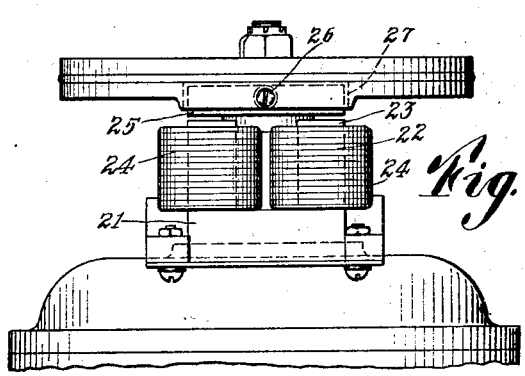
Fig. 2
Inventor:
John W. Dodd,
by Wright, Brown, Quinby & May
att'ys.

May 24, 1927. 1,629,781
J. W. DODD
ELECTRICALLY RELEASED BRAKE
Filed June 3, 1925 2 Sheets-Sheet 2
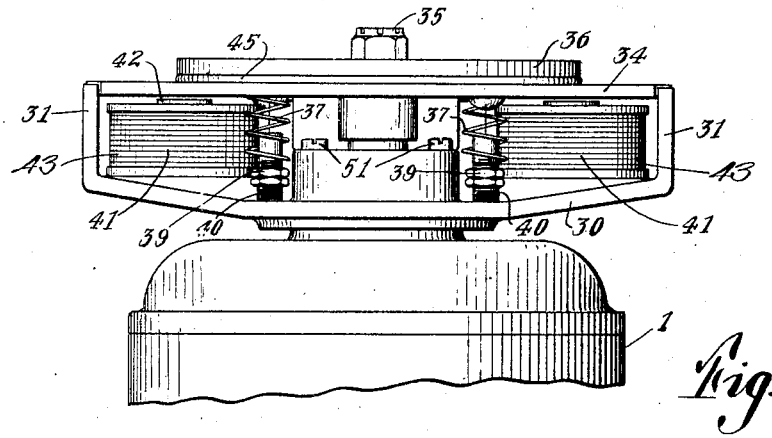
Fig. 5
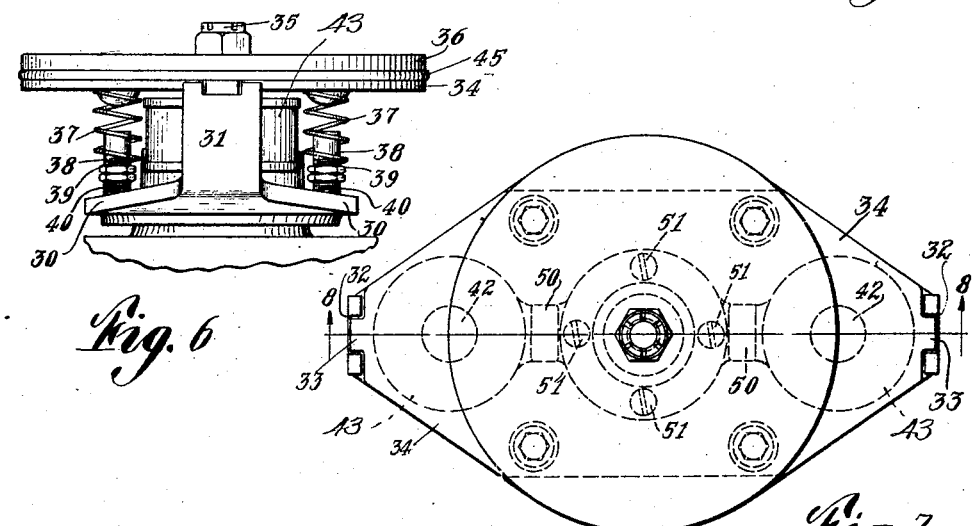
Fig. 6
Fig. 7
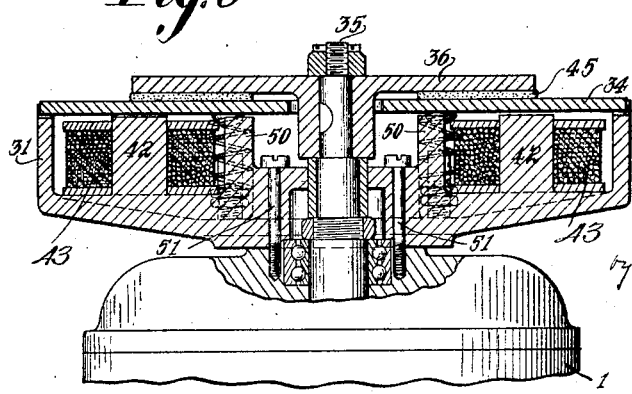
Fig. 8
Inventor:
John W. Dodd,
by Wright, Brown, Quinby & May
attys.

Patented May 24, 1927.

UNITED STATES PATENT OFFICE.

1,629,781

JOHN W. DODD, OF BROOKLINE, MASSACHUSETTS, ASSIGNOR TO GEORGE T. McLAUTHLIN COMPANY, OF BOSTON, MASSACHUSETTS, A CORPORATION OF RHODE ISLAND.

ELECTRICALLY-RELEASED BRAKE.

Application filed June 3, 1925. Serial No. 34,523.

This invention relates to spring applied electrically released brakes of that type particularly suitable for use with electric hoisting or elevator motors, the release devices being energized whenever the motor circuit is closed to operate the motor, and the brake being applied automatically as soon as the current supplied to the motor is cut off.

Certain features of this invention relate to the mounting of the electromagnetic devices and the non-rotary braking element which is movable toward and from the brake disk.

A further feature relates to the mounting of the armature particularly intended for use with alternating current electromagnetic devices by which torsional stresses are avoided when these devices are energized.

For a more complete understanding of this invention reference may be had to the accompanying drawings in which—

Figure 1 is an elevation of an electrically operated elevator hoist showing a brake more particularly designed for alternating current.

Figure 2 is a fragmentary elevation at right angles to Figure 1 showing the brake.

Figure 3 is a fragmentary top plan of the same.

Figure 4 is a detail section on line 4—4 of Figure 3.

Figure 5 is a view similar to a portion of Figure 1, but showing a brake designed for direct current.

Figure 6 is a fragmentary elevation taken at right angles to Figure 5.

Figure 7 is a top plan of the same.

Figure 8 is a detail section on line 8—8 of Figure 7.

Referring first to Figures 1 to 4, 1 indicates the casing of a motor which is shown as arranged with its rotor shaft 2 vertical, the lower end of this shaft carrying a worm 3 meshing with a worm wheel 4 of a suitable hoisting mechanism. At the upper end of the armature shaft 2 is fixed a brake disk 5 to the under face of which may be applied frictional material as 6. Beneath this brake disk 5 is a plate 7 which is slidably axially of the shaft 2. Fixed to the upper face of the motor casing 1 is a frame 8 having upstanding posts 9, each provided with a slot 10 within which extends a lug 11 depending from the plate 7. The engagement of the lugs 11 within the slots 10 act to prevent rotation of the plate 7 with the disk 5. Extending upwardly from the plate 8 are threaded posts 15 on which are supported pairs of nuts 16, abutment washers 17 furnishing seats for the lower ends of coil springs 18 surrounding the upper ends of the pins 15 and bearing at their upper ends against the lower face of the plate 7, thus acting to press this plate toward the disk 5 and into frictional engagement therewith through the friction material 6. The frame 8 has outwardly extending portions 20 to which are fixed pole pieces 21 of electromagnetic devices 22. Around each of the poles 23 of these devices are mounted the solenoids 24. The armatures 25 for these solenoids are pivoted on screw pins 26 within suitable recesses or slots 27 in extensions 28 of the plate 7, these pivots passing substantially centrally laterally of the armatures so that pull exerted thereon through the pole pieces 23 acts to impart a direct pull on the pins 26 and through these on the plate 28. As shown in these figures, the pole pieces and the armatures are laminated, this particular brake being intended for use with alternating current.

Where direct current is to be used, it is unnecessary to laminate the pole pieces of the electromagnets, and Figures 5 to 8 show a construction particularly intended for this class of service. Referring to these figures, it will be seen that a frame 30 is fixed to the motor casing, as by means of bolts 51, this frame having upwardly extending posts 31 at its ends which are slotted as at 32 to form spaces for the reception of lugs 33 extending outwardly from a plate 34. This plate 34 is mounted to move axially of the motor shaft 35 and is normally held pressed toward a disk 36 fixed to this shaft by means of coil springs 37 bearing over centering posts 38 thereon and against adjustable abutment nuts 39 threaded on the centering pins 40 extending upwardly from the frame 30. Inwardly of the posts 31 the frame 30 has fixed thereto the electromagnetic devices 41 comprising pole pieces 42 and solenoids 43, the plate 34 extending over the pole pieces 42 in position to serve as the armature therefor. Friction material may be interposed between the disk 36 and the plate 34 as shown at 45. Toward the shaft 35 the plate 30 may also be provided with upstanding posts 50 which may form other poles of the magnets, about the pole pieces 42 of which the solenoids are placed.

In both constructions shown the electromagnets are energized as long as current is supplied to the motor, they deriving their current from the same source, so that the rotatable and non-rotatable brake elements, comprising the disk 5 and plate 7, respectively, in the form shown in Figures 1 to 4, and the disk 36 and the plate 34, respectively, in the form shown in Figures 5 to 8, are held out of braking relation. As soon as the current supply to the motor is cut off, it is cut off also from the electromagnets, whereupon they become deenergized, and the springs press the non-rotatable plate into braking relation with the rotatable disk and thus stop the rotation of the motor shaft.

Having thus described certain embodiments of this invention it should be evident to those skilled in the art that various changes and modifications might be made therein without departing from its spirit or scope as defined by the appended claims.

I claim:

1. The combination with a motor having a casing and a rotor shaft, of a frame carried by said casing and through which said shaft passes, said frame having marginal portions directed away from said casing and having guideways at their free ends, a plate movable axially of said shaft and having portions fitting said guideways and preventing rotation of said plate with said shaft, a disk fixed to said shaft outwardly of said plate, posts extending outwardly from said frame between said marginal portions, abutments adjustable lengthwise of said posts, springs bearing between said abutments and plate for pressing said plate toward said disk, and electromagnets carried by said frame between said margins and energizable to draw said plate away from said disk against the action of said springs.

2. The combination with a motor having a rotor shaft, of a plate movable axially of said shaft, means for preventing rotation of said plate with said shaft, a disk fixed to said shaft outwardly of said plate, means for pressing said plate toward said disk, an electromagnet positioned to draw said plate from said disk when energized, and an armature for said magnet pivotally connected to said plate.

3. The combination with a motor having a rotor shaft, of a plate movable axially of said shaft, means for preventing rotation of said plate with said shaft, a disk fixed to said shaft outwardly of said plate, means for pressing said plate toward said disk, an electromagnet positioned at the opposite side of said plate from said disk, and an armature for said magnet pivoted to said plate, said magnet when energized acting to draw said plate away from said disk.

4. The combination with a motor having a casing and a rotor shaft, of a frame fixed to said casing and through which said shaft passes, said frame having outwardly extending portions, a plate movable axially of said shaft, and having portions engageable with said frame portions to prevent rotation of said plate with said shaft, a disk fixed to said shaft outwardly of said plate, springs for pressing said plate toward said disk, U shaped electromagnets carried by said frame and having their pole pieces projecting toward said plate, and armatures for said magnets pivotally connected to said plate.

5. The combination with a motor having a casing and a rotor shaft, of a frame fixed to said casing and through which said shaft passes, said frame having outwardly extending portions, a plate movable axially of said shaft, and having portions engageable with said frame portions to prevent rotation of said plate with said shaft, a disk fixed to said shaft outwardly of said plate, springs for pressing said plate toward said disk, U shaped electromagnets carried by said frame and having their pole pieces projecting toward said plate, and armatures for said magnets pivoted for endwise rocking movement within slots in said plate.

6. The combination with a motor having a casing and a rotor shaft, of a frame carried by said casing and through which said shaft passes, said frame having portions directed away from said casing and having guide portions at their free ends, a plate movable axially of said shaft and having mating guide portions to prevent rotation of said plate with said shaft, a disk fixed to said shaft outwardly of said plate, posts extending outwardly from said frame, abutments adjustable lengthwise of said posts, springs bearing between said abutments and plate for pressing said plate toward said disk, and electromagnets carried by said frame and energizable to draw said plate away from said disk against the action of said springs.

In testimony whereof I have affixed my signature.

JOHN W. DODD.